Oct. 11, 1932.   D. H. SPICER   1,882,455
DUAL TIRE PRESSURE EQUALIZER
Filed Oct. 4, 1930    3 Sheets-Sheet 3
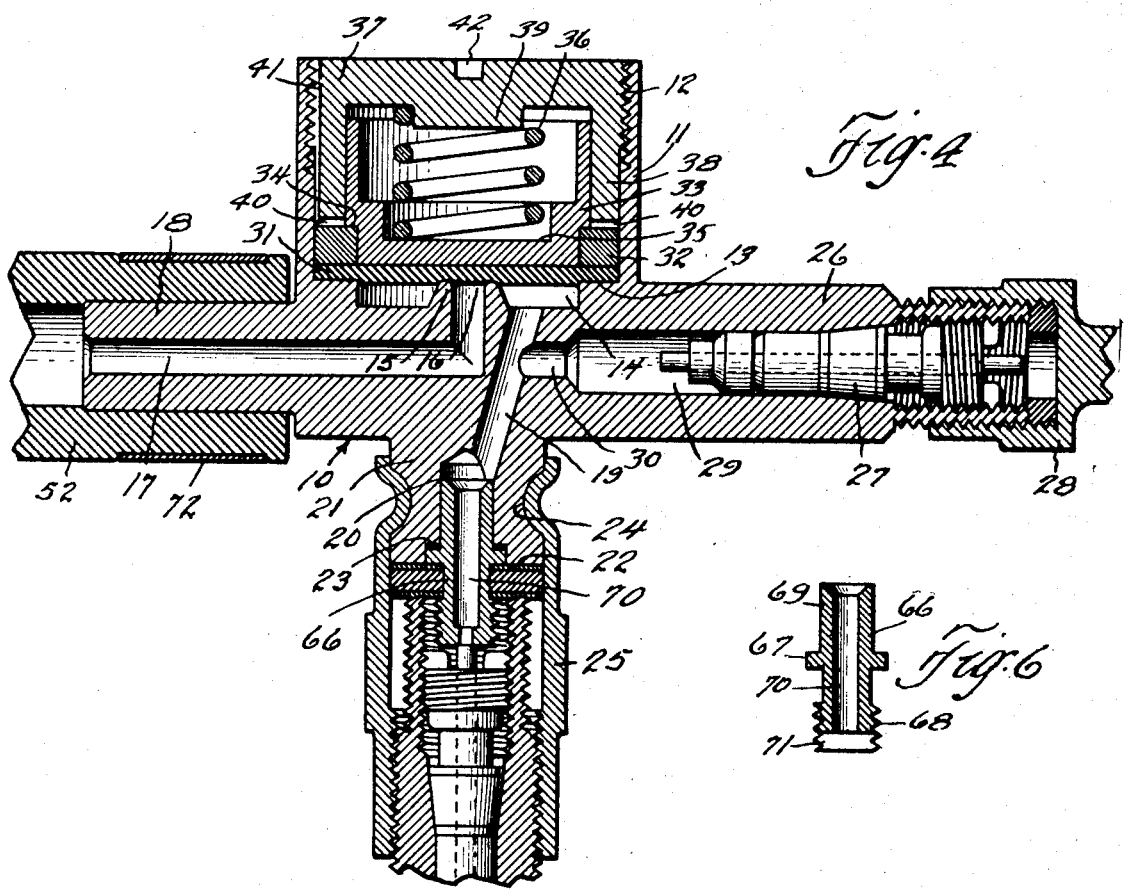
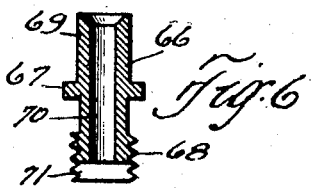
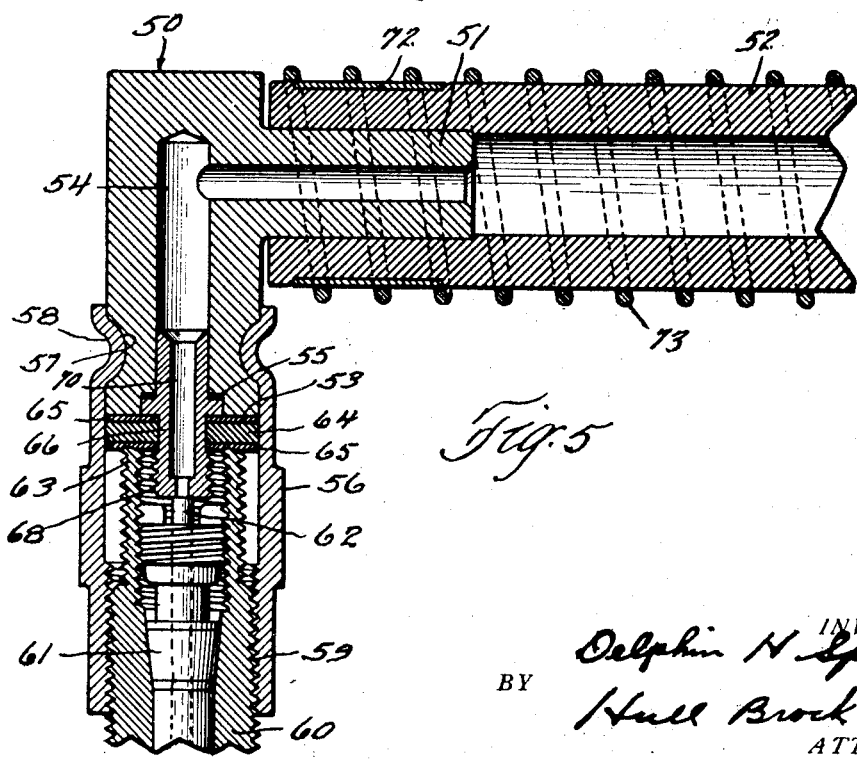
INVENTOR
Delphin H. Spicer
BY
Hull Brock & West
ATTORNEYS Patented Oct. 11, 1932

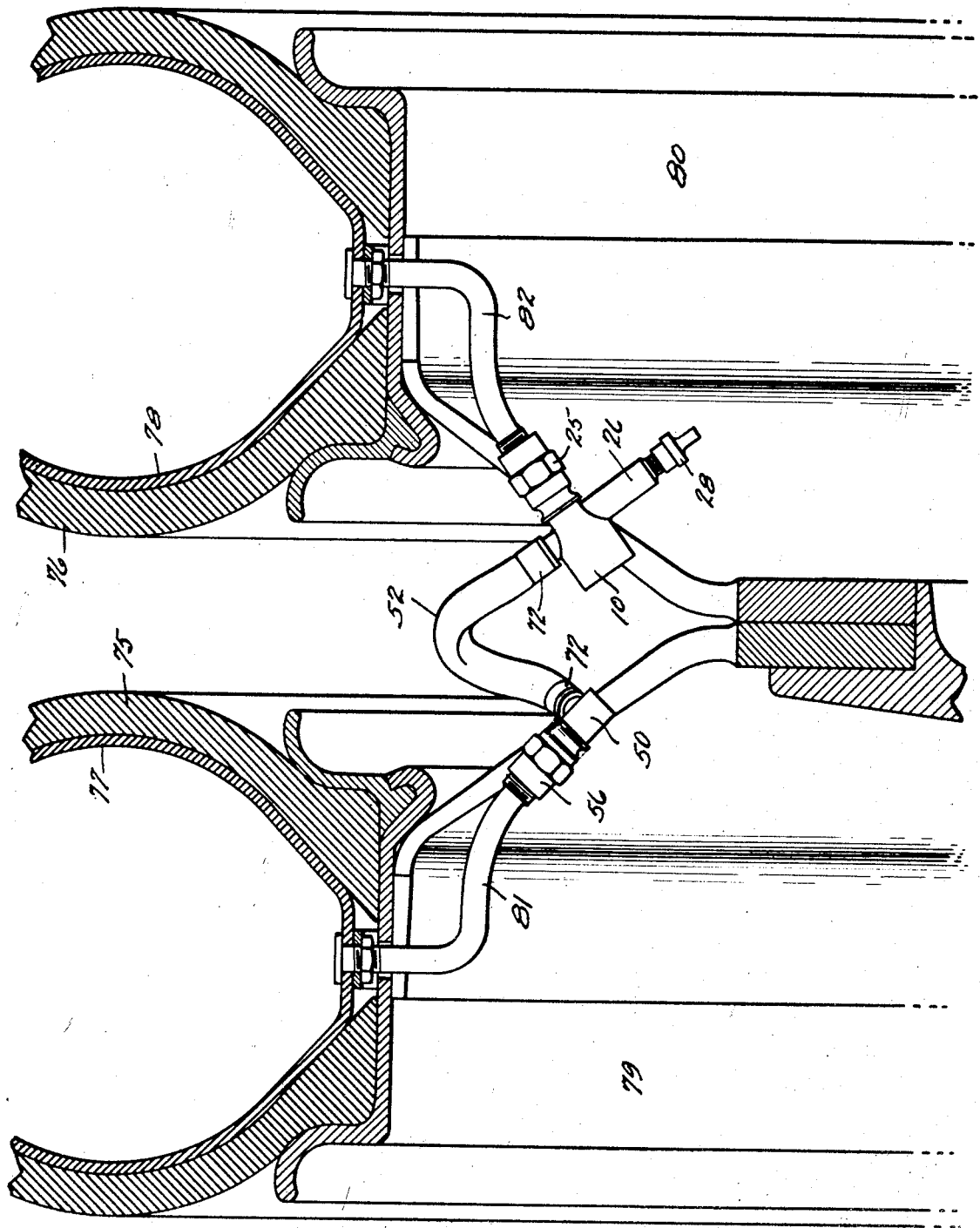

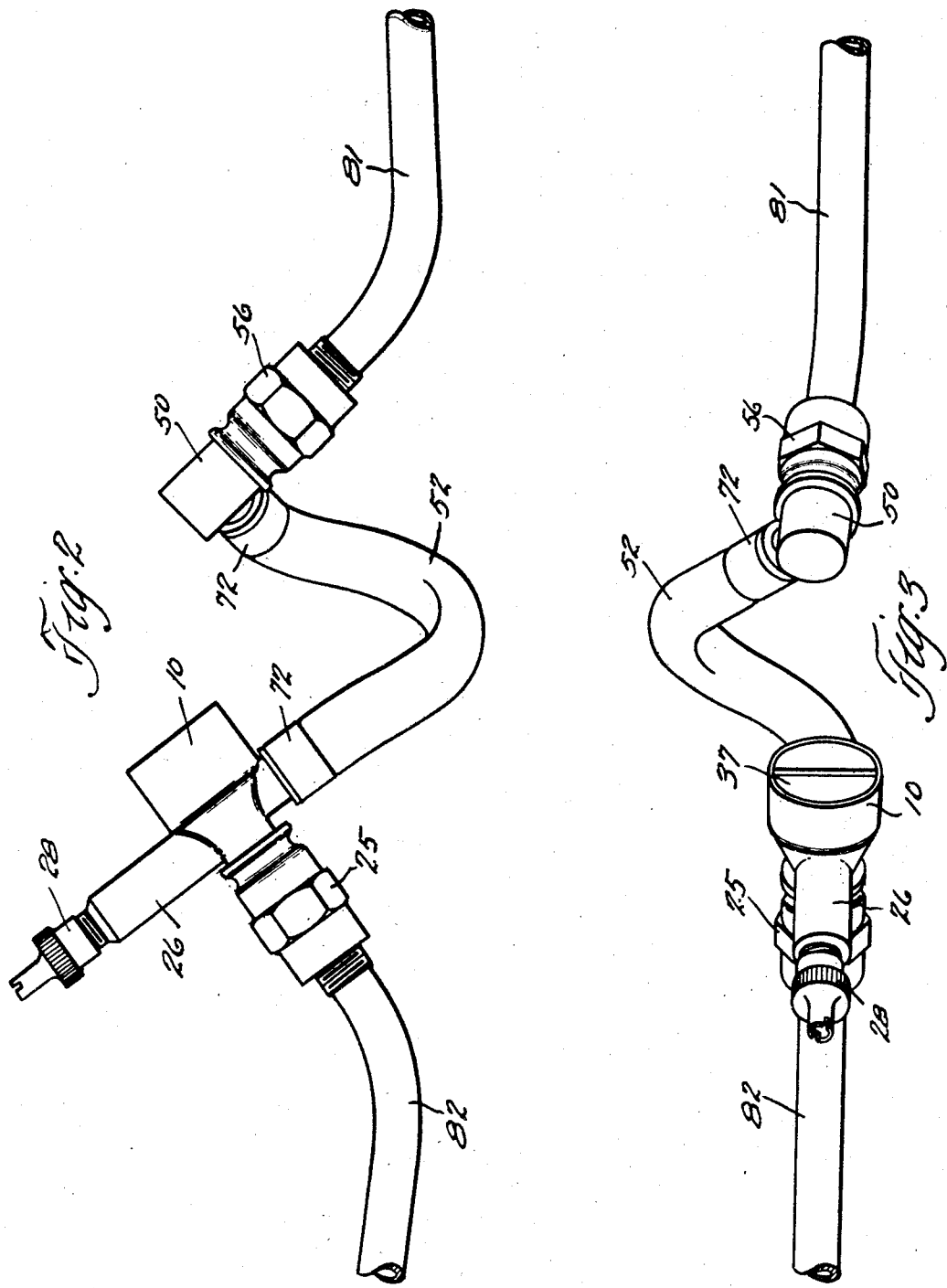

1,882,455

UNITED STATES PATENT OFFICE

DELPHIN H. SPICER, OF LAKEWOOD, OHIO, ASSIGNOR TO SPICER AIRFLATER, INC., OF CLEVELAND, OHIO, A CORPORATION OF OHIO

DUAL TIRE PRESSURE EQUALIZER

Application filed October 4, 1930. Serial No. 486,354.

This invention relates to dual tire pressure equalizers and its function is to establish and maintain equal pressures in the tires of dual wheels except under certain special conditions hereinafter to be brought out. It has been found in practice that the advantages of dual wheels are sufficiently great to justify their use in a large percentage of trucks and busses even in the face of numerous difficulties which have existed and most of which are overcome by the use of the improved equalizer hereinafter described.

This application is a continuation in part of my copending application Serial No. 370,378, filed June 12, 1929.

In the use of dual tires it has been found that the inner tire becomes heated to a temperature very considerably in excess of that existing in the usual tire due to close proximity to brakes, poor air cooling and other causes. Assuming the two tires are inflated to the same pressure at the beginning of a trip, the inner tire, due to the rise in temperature, will be found after a short distance to have a higher pressure than the outer one. This results in the carrying of a disproportionate share of the load by the inner tire, with the result that the temperature is further increased. Attempts to overcome this difficulty by under-inflation of the inner tire have not proved successful because the amount of under-inflation necessary is so great that during a large portion of the time the outer tire will carry a very disproportionate share of the load. It has been found impossible to do more than slightly relieve the difficulties by this method. I am aware that prior to this invention the equalization of pressure in the two tires by interconnecting the same has been proposed, but so far as I am aware, no thoroughly practical equalizer, adapted for general use on principal varieties of dual tire, has been devised.

In the construction of dual tires a wide variety of valve stem constructions is encountered. Most of the stems are bent more or less after the fashion of those indicated in Fig. 1 of the drawings, but there is considerable variety in the angles and spacing, also in the openings in the wheel disk or spoke through which the equalizer must extend for connection and through which it is necessary to introduce the compressed air line for inflation in the absence of the equalizer. As a result of these constructions, it is difficult to attach an equalizer and particularly such constructions as have heretofore been tried. In order to provide a single construction of equalizer which is adaptable for use on the various wheels employed on busses or trucks, it is desirable to use a flexible connection between the portions of the equalizer which connect to the two stems. Inasmuch as foreign bodies are often pushed or thrown between the two tires of a pair, it often happens that serious damage is done to fragile mechanism and to overcome this difficulty, it is desirable to use an armored tube. Considerable difficulty has been encountered in securing an air-tight non-leaking coupling between the valve stem and the equalizer. Accordingly, the principal object of my invention is to provide a device in which the mentioned difficulties can be overcome by the use of the simplest possible mechanism consistent with the efficient performance of the necessary functions. A more limited object is to provide an improved coupling for securing an air-tight seal. A further object is to avoid damage to the sealing diaphragm which I employ by the employment of a pressure member which bears against substantially the entire movable area thereof. A further object is to provide for adjustment of the tension exerted against the sealing diaphragm.

A further object is to avoid excessive "bite" of the valve seat against the said diaphragm. A further object is to provide a flexible coupling whereby the device can be used on a large variety of tires. A further object is to avoid twist in such coupling when the same is in properly installed position whereby to avoid any tendency for the inflation tube to be inaccessibly placed and to reduce the chances of damage to the tubes or connections. A further object is to provide greater facility in installation. Other and more limited objects will become apparent from the following description.

Fig. 1 is a schematic showing of an illustrated installation; Fig. 2 is an elevation of my improved coupling in position of use; Fig. 3 is a plan view of the same; Fig. 4 is an enlarged section taken through the valve body; Fig. 5 is an enlarged section through the coupling member remote from the valve body; and Fig. 6 is a detail of a portion of the coupling provided for use in connection with the valve stem.

Referring to the accompanying drawings, the valve body which contains the major portion of the mechanism is indicated generally by the numeral 10. At one side the valve body 10 is provided with an upstanding convex portion 11 which is hollowed out to provide a valve chamber. This portion 11 is internally threaded as at 12 and is provided with a ledge 13, and an outer annular passage or depression 14 below the ledge 13, a valve seat 15 upstanding to substantially the height of the ledge 13 and perforated by an inner passage 16. The passage 16 communicates with a bore 17 which extends through a minor coupling 18. The outer annular passage 14 communicates through an angularly extending bore 19 with a bore 20 in the coupling boss 21. The boss 21 has the enlarged bore extending from the seating surface 22 and the same is enlarged adjacent such surface as shown at 23 for a purpose hereinafter described. An encircling depression 24 is provided for connection of a clamping sleeve 25. The valve body 10 is provided with an inflation tube 26 extending therefrom, and this tube is adapted to contain one of the standard valve cores 27 and be closed by a standard valve cap 28. The stem is provided of course with a central bore 29 and this communicates by means of a short bore 30 with the connecting passage 19.

A comparatively thick rubber diaphragm 31 is shaped to fit closely within the valve chamber and to seat against the ledge 13 and the valve seat 15. A washer 32 which fits snugly within the valve chamber is adapted to rest and be clamped upon the peripheral outer edge of the diaphragm to securely seal the same against passage of air therearound. This washer may be made of various thicknesses or may be made up of a plurality of thin washers for the purpose of adjusting spring tension. A pressure member 33 is provided to extend within the washer 32 and engage the upper surface of the diaphragm 31. This pressure member will preferably be of sufficient size to fit snugly within the washer 32, and is provided with a shoulder 34 engaging the upper surface of the washer 32 to limit the "bite" of the valve seat 15 into the rubber diaphragm 31. In the event the washer 32 is made up of a plurality of thin washers, it will be necessary to make corresponding adjustment of the position of the shoulder 34 in order to maintain the distance from such shoulder to the diaphragm-engaging surface of the pressure member 33 equal to the thickness of such composite washer. Pressure member 32 is provided with a depression 35 which is adapted to receive and position one end of a helical spring 36. A cap member 37 is received in the threaded portion 12 of the valve body and engages the upper surface of the washer 32 having a depending flange 38 extending downwardly for that purpose. A boss 39 is provided for extending into the upper end of and positioning the spring 36. The size of the spring 36 and the various dimensions of the cap 37 and washer 32 are so designed as to secure the desired pressure on the diaphragm 31. Cap 37 is provided with notches 40 in its lower end and with a notch 41 extending upwardly along one side to prevent the possibility of any greater than atmospheric pressure being exerted by any air which may impinge upon the outer surface of the diaphragm 31. A kerf 42 is provided in the upper surface of the cap 37 for reception of a screw driver.

The coupling which I provide for connecting to the valve stem will now be described with particular reference to the showing in Fig. 5. Inasmuch as the two couplings are identical in construction, that one shown in Fig. 4 will not be described in detail. A coupling body 50 is provided with a projection 51 which is adapted to be connected with the flexible cable 52. This body has a seating surface 53, a bore 54 and an enlargement 55 of the bore 54 exactly as described in connection with the coupling boss 21 shown in Fig. 4. A clamping sleeve 56 is rolled into a circular groove 57 in the coupling body 50, as shown at 58, and is thereby swiveled on such body. The sleeve 56 is internally threaded, as shown at 59, and is adapted to be threaded over a valve stem 60. The valve stem 60 has the usual valve core 61 having the valve pin 62 extending upwardly therefrom for controlling its valve action and the reduced end portion 63. A sealing device is provided for cooperation with the coupling body and the reduced portion 63 of the valve stem 60 (refer to Figs. 5 and 6).

This sealing device is provided with a composite washer consisting of a rubber disk 64 having vulcanized thereto on the two sides thereof rubber impregnated fabric washers 65. The washers 64 and 65 are provided with a central opening through which extends a stem 66. This stem has a collar 67 which prevents its being pulled through the composite washer 64, 65 and a threaded boss 68 which is adapted for engagement with the valve pin 62 for holding the same depressed to open the valve 61 when the coupling is in position thereon. An extension of the stem 66 is provided, as shown at 69, of a size to effect light frictional engagement with the interior of the bore 54 to prevent the sealing assembly from falling out of the sleeve 56 when the coupling is disengaged from the tire valve stem. The boss 68 is externally threaded for engagement with a tool which I prefer to employ for extracting the same in the event a renewal thereof is necessary. As will be seen from the drawings, the stem 67 is provided with an internal bore 70 which extends through the portion 69 to a point adjacent to but spaced from the opposite end. A kerf 71 narrower than the valve pin 62 and likewise narrower than the diameter of the body 70, is provided for reception of a screw driver and communicates with the bore 70 whereby air may pass therethrough. If desired, the extension 69 may be made of somewhat resilient material, longitudinally kerfed and spread somewhat as an alternative method of providing the frictional engagement for holding the assembly in position.

The tube 52 may be constructed in accordance with the best known practice in making strong flexible tubes, and I prefer to attach the same to the extensions 18 and 51 as by means of clamping rings 72. In order to protect the tube I insert the same through a helical spring 73 of such a length as to bear lightly against the coupling body 50 and the valve body 10. The convolutions of the spring 73 are placed sufficiently close together as to afford the desired protection. It is not essential that a spring be employed, other flexible armor being feasible, but I prefer to use the spring in view of its efficiency and simplicity.

In Fig. 1 I have shown a representative assembly with my improved equalizer in position. A pair of tires 75 and 76 provided with the usual inner tubes 77 and 78 are shown mounted on conventional rims 79 and 80, and the usual valve stems 81 and 82 are shown as connected with the tubes 77 and 78 and extending outwardly and converging toward each other at a generally central region. The coupling sleeve 25 is shown threaded upon the valve stem 82 and the sleeve 56 is shown connected with the stem 81. The valve body 10 and the coupling body 50 are shown connected by the tube 52. From this view the relations of the various parts can be seen. Also the somewhat vulnerable position of the flexible tube is apparent. Any stone or foreign body which might be thrown or squeezed through the opening between the tires 75 and 76 is somewhat likely to strike the bowed portion of the tube. In such an event the armor 73 is very effective in preventing damage. The brake drum which is comparatively close to the rim 79 has not been shown. However, it will be understood that it is present, and its effect in heating up the tire 75 and cutting off ventilation thereof will be evident. By reference to Figs. 2 and 3, the relation of the valve stems to the parts of my equalizer will be evident. The arrangement of the axis of the coupling body 50 at 90° to the axis of the valve body 10 when the flexible tube 52 is straight, and its resulting avoidance of twist in the tube when installed, is brought out in Figs. 2 and 3.

In installing this device, the mechanic will be on the outside and will attach the sleeve 56 to the valve stem 81 before attaching the sleeve 25 to the stem 82, as this enables him to push the valve body 10 out of the way by reason of the flexibility of the tube 52. Also, as will be evident from Figs. 2 and 3, the valve body 50 should be so oriented at the time of installation that the tube will extend at an angle from the plane of the valve stems. This arrangement results in great convenience of installation. After the coupling body 50 has been connected to the stem 81, it is a simple matter to connect the sleeve 25 to the stem 82 and thereby complete the installation. Inflation can be made through the tube 26 in the ordinary manner just as if the equalizer were not present, with the exception that both tires are inflated through the same inflation stem.

When the coupling 50 is connected on the valve stem of the inner tire, the boss 68 engages the valve pin 62 to open the valve. The interior of the tube of the inner tire is then in communication with the inner passage 16 and a pressure equal to that in said inner tire impinges upon the diaphragm 31 over the limited area of the inner passage 16 and exerts a small force tending to lift said diaphragm against the action of the spring 36 to establish communication between the inner and outer passages. Due, however, to the small area of the said inner passage, the valve will not be opened since the spring is of a strength sufficient to resist opening by force over substantially its entire area of the same order of magnitude as exerted by the tires at normal inflation pressure. Thus, when the connection is made to the inner tire, there will be no loss of air therefrom. The sleeve 25 is then connected on the valve stem of the outer tire with the result that the pressure in such tire impinges upon the surface of the diaphragm which is exposed to the outer passage 14. Assuming that the tires are both inflated to their normal running pressure, the diaphragm will now be elevated against the action of the spring 36 with the result that the interiors of the two tires will be in communication. In view of the fact that the bore 29 in the stem 26 communicates with the outer passage 14, it is possible to further inflate the tires in the usual manner by applying the compressed air line to the inflation stem 26.

In the event the inner tire should blow or leak, the tires will remain in communication until the pressure falls to a predetermined value determined by the strength of the spring 26 after which the diaphragm will contact the valve seat 15 sufficiently to cut off communication between the two tires. The outer tire will then remain inflated and permit continued use of the vehicle until such time as it is convenient to make repairs. If the outer tire should blow out or leak, the cut-off of communication would occur at substantially the same pressure. It has been found in practice that the valve closes at a higher pressure in the case of a blow-out or sudden reduction of pressure than is the case in a slow leak. Thus, in the case of a blow-out of one of the tires, where communication would be cut off at 50 pounds per square inch by a slow leak, a cut-off as high as 57 pounds has been effected from an initial pressure of 60 pounds per square inch. In the event the tube should break or be loosened, the inner tire will be deflated, while the outer one remains in a usable condition.

From the foregoing description, it will be obvious that I have provided a pressure equalizer embodying numerous improved features, and while such features of the invention have been described in connection with a preferred embodiment, I wish it understood that my invention is not limited to the details of such illustrations but is susceptible of being carried out in numerous variant forms within the scope of the appended claims.

Having thus described my invention, what I claim is:

1. A dual-tire pressure equalizer including, a valve body having a valve chamber formed therein, a rubber diaphragm in said chamber, a ledge adjacent to and spaced from the bottom of said chamber and upon which said diaphragm seats, a valve seat upstanding from the bottom of said valve chamber and defining between itself and said ledge an outer passage, an inner passage formed in said valve body and perforating said valve seat, means clamping said diaphragm against said ledge whereby to seal off said passages from the upper portion of said chamber, a pressure member engaging the upper surface of said diaphragm, means resiliently urging said pressure member against said diaphragm whereby to cause the latter to engage said valve seat for shutting off communication between said inner and outer passages, said pressure member being of such a size as to engage substantially the entire free, upper surface of said diaphragm.

2. A dual-tire pressure equalizer including, a valve body having a valve chamber formed therein, a rubber diaphragm in said chamber, a ledge adjacent to and spaced from the bottom of said chamber and upon which said diaphragm seats, a valve seat upstanding from the bottom of said valve chamber and defining between itself and said ledge an outer passage, an inner passage formed in said valve body and perforating said valve seat, an annular member overlying said ledge and clamping said diaphragm against said ledge whereby to seal off said passages from the upper portion of said chamber, a pressure member engaging the upper surface of said diaphragm, means resiliently urging said pressure member against said diaphragm whereby to cause the latter to engage said valve seat for shutting off communication between said inner and outer passages, said pressure member being of such a size as to engage substantially the entire free, upper surface of said diaphragm, said pressure member fitting snugly within said annular member and being provided with a shoulder overlying a portion of the same and adapted to engage thereagainst for limiting the bite of said valve seat into said diaphragm.

3. In a tire pressure equalizer, a valve body, a depression formed in one portion of said body, a flexible diaphragm covering said depression, means securing said diaphragm in sealing relation over said depression, a valve seat in said depression against which said diaphragm may bear in seating relation, there being a passage in said body through said valve seat adapted to be closed by engagement of said diaphragm against said seat, means for connecting said passage in communicating with the interior of a tire, a second passage communicating with said depression, means for connecting said second passage in communication with the interior of another tire, said first and second passages being in communication except when said diaphragm seats against said valve seat, means resiliently urging said seat and diaphragm into seating relation, and a valved inflation passage communicating with one of said passages.

4. In a tire pressure equalizer, a valve body, a depression formed in one portion of said body, a flexible diaphragm covering said depression, means securing said diaphragm in sealing relation over said depression, a valve seat in said depression against which said diaphragm may bear in seating relation, there being a passage in said body through said valve seat adapted to be closed by engagement of said diaphragm against said seat, means for connecting said passage in communication with the interior of a tire, a second passage communicating with said depression, means for connecting said second passage in communication with the interior of another tire, said first and second passages being in communication except when said diaphragm seats against said valve seat, means resiliently urging said seat and diaphragm into seating relation, and a valved inflation passage communicating with one of said passages, both said passages communicating with said depression on the same side of said diaphragm, and said valve seat consisting of a raised portion integral with said valve body through which said first passage extends.

In testimony whereof, I hereunto affix my signature.

DELPHIN H. SPICER.